US012811867B2

(12) United States Patent
Lee et al.

(10) Patent No.: US 12,811,867 B2
(45) Date of Patent: Nov. 24, 2026

(54) TRACKING CALL METRICS IN A RADIO ACCESS NETWORK (RAN)

(71) Applicant: Boost SubscriberCo L.L.C., Englewood, CO (US)

(72) Inventors: Uncheol Lee, KwangMyenong City (KR); Heechul Yoo, Seoul (KR); Scott Lawrence Kitchens, Colorado Springs, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 274 days.

(21) Appl. No.: 18/741,114

(22) Filed: Jun. 12, 2024

(65) Prior Publication Data

US 2025/0385851 A1 Dec. 18, 2025

(51) Int. Cl.

*H04L 43/0823* (2022.01)
*H04L 65/1016* (2022.01)
*H04L 65/1046* (2022.01)

(52) U.S. Cl.

CPC ...... *H04L 43/0823* (2013.01); *H04L 65/1016* (2013.01); *H04L 65/1046* (2013.01)

(58) Field of Classification Search

None

See application file for complete search history.

(56) References Cited

U.S. PATENT DOCUMENTS

| | | | | |
|---|---|---|---|---|
| 10,506,485 | B2 * | 12/2019 | Zheng | H04L 65/1016 |
| 2009/0019158 | A1 * | 1/2009 | Langen | H04L 67/568<br>709/226 |
| 2011/0252154 | A1 * | 10/2011 | Bunch | H04L 65/1043<br>709/230 |
| 2023/0075625 | A1 * | 3/2023 | Patel | H04M 3/42221 |

* cited by examiner

*Primary Examiner* — Diane L Lo

(74) *Attorney, Agent, or Firm* — Lowenstein Sandler LLP

(57) ABSTRACT

A computer-implemented method for tracking calls attempted or established between a mobile device and a radio access network includes: receiving, using a first function registered with an operating system of a mobile device, information indicative of a transition of a call state associated with a voice call associated with the mobile device from a first state to a second state, determining, based on the information, that the first state is an active state and the second state is a disconnected state, responsive to determining that the first state is an active state and the second state is a disconnected state, receiving, using a second function registered with the operating system, information indicative of a reason for disconnection of the voice call, and identifying, based on the information indicative of the reason for the disconnection of the voice call, a device-side issue responsible for the disconnection of the voice call.

20 Claims, 7 Drawing Sheets

400

| No | Old PreciseCallState | New PreciseCallState | IMS Reason Info | Verdict |
|---|---|---|---|---|
| 1 | DIALING | IDLE/DISCONNECTED | Not used | Call Setup Failure |
| 2 | ALERTING | IDLE/DISCONNECTED | Not used | Call Setup Failure |
| 3 | INCOMING | IDLE/DISCONNECTED | Normal Call End | Call Success |
| 4 | INCOMING | IDLE/DISCONNECTED | Call Failure | Call Setup Failure |
| 5 | ACTIVE | IDLE/DISCONNECTED | Normal Call End | Call Success |
| 6 | ACTIVE | IDLE/DISCONNECTED | Call Failure | Call Drop |
| 7 | DISCONNECTING | IDLE/DISCONNECTED | Normal Call End | Call Success |
| 8 | DISCONNECTING | IDLE/DISCONNECTED | Call Failure | Call Drop |

FIG. 2

TRACKING CALL METRICS IN A RADIO ACCESS NETWORK (RAN)

TECHNICAL FIELD

The present disclosure relates to a computer-implemented method for tracking calls attempted or established between a mobile device and a radio access network (RAN), and more particularly, a mobile device configured to track calls attempted or established to the RAN.

BACKGROUND

A conventional network Key Performance Indicator (KPI) application is a tool used by network operators to monitor, analyze, and optimize the performance of a communication network. This application collects data from various network components, such as base stations, routers, and switches, to evaluate metrics like latency, throughput, packet loss, and signal strength. By continuously analyzing these KPIs, the application alerts about network health and performance issues. Network operators may use this information to diagnose problems and make informed decisions about network management.

SUMMARY

The present disclosure is directed to tracking calls attempted or established between a mobile device and a radio access network (RAN).

According to one aspect of the subject matter described in this application, a computer-implemented method for tracking calls attempted or established between a mobile device and a radio access network (RAN) can include receiving, using a first function registered with an operating system of a mobile device, first information indicative of a transition of a call state associated with a voice call associated with the mobile device from a first state to a second state, wherein the first function is configured to interface with a first set of one or more application programming interfaces (APIs) of the operating system, and wherein the first information indicative of the transition of the call state is received through at least one API of the first set of one or more APIs, determining, based on the first information, that the first state is an active state and the second state is a disconnected state, responsive to determining that the first state is an active state and the second state is a disconnected state, receiving, using a second function registered with the operating system of a mobile device, information indicative of a reason for disconnection of the voice call, wherein the second function is configured to interface with a second set of one or more APIs of the operating system, wherein the information indicative of the reason for the disconnection of the voice call is received through at least one API of the second set of one or more APIs, and wherein the information indicative of the reason for the disconnection of the voice call is generated based on an output of an IP Multimedia Subsystem (IMS) of the mobile device, and identifying, based on the information indicative of the reason for the disconnection of the voice call, a device-side issue responsible for the disconnection of the voice call.

Implementations according to this aspect can include one or more of the following features. For example, the first function can be registered with a telephony framework to thereby specify types of call state changes to be monitored.

In some implementations, the first function can be registered with the at least one API of the first set of one or more APIs to thereby monitor an event.

In some implementations, the computer-implemented method can further include receiving, using the first function, second information indicative of a transition of a call state from a third state to a fourth state, determining, based on the second information, that the third state is not an active state and the fourth state is a disconnected state, responsive to determining that the third state is not an active state and the fourth state is a disconnected state, receiving, using the second function registered with the operating system of a mobile device, information indicative of a reason for setup failure of the voice call, wherein the information indicative of the reason for the setup failure of the voice call is received through the at least one API of the second set of one or more APIs, and wherein the information indicative of the reason for the setup failure of the voice call is generated based on the output of the IMS of the mobile device, and identifying, based on the information indicative of the reason for the setup failure of the voice call, a device-side issue responsible for the setup failure of the voice call.

In some examples, identifying the device-side issue responsible for the setup failure of the voice call can include acquiring information including device information, modem information, software (SW) information, cell information, new radio (NR) cell information, long-term-evolution (LTE) cell information, NR signal information, LTE signal information, geolocation information, and a subscriber identity module (SIM) information, and determining the device-side issue based on the acquired information. In some implementations, identifying the device-side issue responsible for the disconnection of the voice call can include acquiring information including device information, modem information, software (SW) information, cell information, new radio (NR) cell information, long-term-evolution (LTE) cell information, NR signal information, LTE signal information, geolocation information, and a subscriber identity module (SIM) information, and determining the device-side issue based on the acquired information.

In some examples, identifying the device-side issue responsible for the disconnection of the voice call can include transmitting, to a server, the acquired information to thereby cause the server to identify the device-side issue responsible for the disconnection of the voice call, where the server can be configured to identify modem failures in certain SW versions on particular devices based on the device information, the modem information, and the SW information. In some implementations, the call state of the mobile device can transition from the active state to the disconnected state based on a signal received from a network, the signal indicating termination of a call associated with the voice call.

In some examples, the call state of the mobile device can transition from the first state to the disconnected state based on a signal received from a network, the first state not corresponding to the active state and the signal indicating termination of the voice call.

According to another aspect of the subject matter described in this application, a non-transitory recording medium can store a program, wherein execution of the program causes one or more mobile devices of a wireless communication system to perform operations comprising: receiving, using a first function registered with an operating system of a mobile device, first information indicative of a transition of a call state associated with a voice call associated with the mobile device from a first state to a second state, wherein the first function is configured to interface with a first set of one or more application programming interfaces (APIs) of the operating system, and wherein the first information indicative of the transition of the call state is received through at least one API of the first set of one or more APIs, determining, based on the first information, that the first state is an active state and the second state is a disconnected state, responsive to determining that the first state is an active state and the second state is a disconnected state, receiving, using a second function registered with the operating system of a mobile device, information indicative of a reason for disconnection of the voice call, wherein the second function is configured to interface with a second set of one or more APIs of the operating system, wherein the information indicative of the reason for the disconnection of the voice call is received through at least one API of the second set of one or more APIs, and wherein the information indicative of the reason for the disconnection of the voice call is generated based on an output of an IP Multimedia Subsystem (IMS) of the mobile device, and identifying, based on the information indicative of the reason for the disconnection of the voice call, a device-side issue responsible for the disconnection of the voice call.

Implementations according to this aspect can include one or more of the following features. For example, the first function can be registered with a telephony framework to thereby specify types of call state changes to be monitored. In some implementations, the first function can be registered with the at least one API of the first set of one or more APIs to thereby monitor an event.

In some implementations, the operations can further include receiving, using the first function, second information indicative of a transition of a call state from a third state to a fourth state, determining, based on the second information, that the third state is not an active state and the fourth state is a disconnected state, responsive to determining that the third state is not an active state and the fourth state is a disconnected state, receiving, using the second function registered with the operating system of a mobile device, information indicative of a reason for setup failure of the voice call, wherein the information indicative of the reason for the setup failure of the voice call is received through the at least one API of the second set of one or more APIs, and wherein the information indicative of the reason for the setup failure of the voice call is generated based on the output of the IMS of the mobile device, and identifying, based on the information indicative of the reason for the setup failure of the voice call, a device-side issue responsible for the setup failure of the voice call.

In some examples, identifying the device-side issue responsible for the setup failure of the voice call can include acquiring information including device information, modem information, software (SW) information, cell information, new radio (NR) cell information, long-term-evolution (LTE) cell information, NR signal information, LTE signal information, geolocation information, and a subscriber identity module (SIM) information, and determining the device-side issue based on the acquired information. In some implementations, identifying the device-side issue responsible for the disconnection of the voice call can include acquiring information including device information, modem information, software (SW) information, cell information, new radio (NR) cell information, long-term-evolution (LTE) cell information, NR signal information, LTE signal information, geolocation information, and a subscriber identity module (SIM) information, and determining the device-side issue based on the acquired information.

In some examples, identifying the device-side issue responsible for the disconnection of the voice call can include transmitting, to a server, the acquired information to thereby cause the server to identify the device-side issue responsible for the disconnection of the voice call, where the server can be configured to identify modem failures in certain SW versions on particular devices based on the device information, the modem information, and the SW information.

In some implementations, the call state of the mobile device can transition from the active state to the disconnected state based on a signal received from a network, the signal indicating termination of a call associated with the voice call. In some examples, the call state of the mobile device can transition from the first state to the disconnected state based on a signal received from a network, the first state not corresponding to the active state and the signal indicating termination of the voice call.

According to another aspect of the subject matter described in this application, a computer-implemented device for tracking calls attempted or established between a mobile device and a radio access network (RAN) can include at least one processor and memory coupled to the at least one processor and storing instructions that, based on being executed by the at least one processor, perform operations. The operations can include receiving, using a first function registered with an operating system of a mobile device, first information indicative of a transition of a call state associated with a voice call associated with the mobile device from a first state to a second state, wherein the first function is configured to interface with a first set of one or more application programming interfaces (APIs) of the operating system, and wherein the first information indicative of the transition of the call state is received through at least one API of the first set of one or more APIs, determining, based on the received information, that the first state is an active state and the second state is a disconnected state, responsive to determining that the first state is an active state and the second state is a disconnected state, receiving, using a second function registered with the operating system of a mobile device, information indicative of a reason for disconnection of the voice call, wherein the second function is configured to interface with a second set of one or more APIs of the operating system, wherein the information indicative of the reason for the disconnection of the voice call is received through at least one API of the second set of one or more APIs, and wherein the information indicative of the reason for the disconnection of the voice call is generated based on an output of an IP Multimedia Subsystem (IMS) of the mobile device, and identifying, based on the information indicative of the reason for the disconnection of the voice call, a device-side issue responsible for the disconnection of the voice call.

Implementations according to this aspect can include one or more of the following features. For example, identifying the device-side issue responsible for the disconnection of the voice call can include acquiring information including cell information, new radio (NR) cell information, long-term-evolution (LTE) cell information, NR signal information, LTE signal information, geolocation information, and a subscriber identity module (SIM) information, and determining the device-side issue based on the acquired information.

BRIEF DESCRIPTION OF THE DRAWINGS

FIG. 2 is a diagram illustrating an example of a call verdict table.

DETAILED DESCRIPTION

Network operations for 5G Open Radio Access Networks (O-RANs) are primarily monitored from the network side. Such monitoring is often not adequate to detect issues originating from the device. For example, if a call initiated on the device fails to connect to the network, the network may remain unaware of the attempted call, and any monitoring on the network side may miss logging the failed call initiation attempt. In such cases, root causes of such failed attempts can go undetected potentially over long periods of time-which in turn can adversely affect network performance parameters. Similarly, in some cases, root causes of call drops or failures may not be adequately identified via network-side monitoring. For example, call terminations can occur due to modem failures/reset on the device side, but the cause of such terminations may not be apparent at the network side. Consequently, even if the termination itself is logged via network-side monitoring, the cause of the termination may go undetected-which in turn can result in redundant remedial efforts leading to wasted resources.

The present disclosure is directed to address the above-referenced issues by monitoring certain network operations at the user devices. For example, by invoking intelligently selected application programming interfaces (APIs) to the operating system, various network performance parameters such as call setup success, call setup failure, call completion, can be tracked at the user devices connected to the network. For example, when a device determines that an ongoing call has dropped, the device can access a telephony framework (e.g., through an appropriate API of the operating system) to acquire relevant information such as device information, modem information, and software (SW) information, and analyze the information to identify a cause of the call drop. Because the API (or a combination of APIs) allows for accessing granular information that can be used to identify device-side issues, root causes that would not be apparent to a network-side monitoring process can be detected/identified, and remedial actions taken accordingly. This in turn can allow for faster detection and remedy of network issues in general, as compared to that possible via network-side monitoring, and thereby contribute to improved and more resource-efficient network performance.

Figure 1:
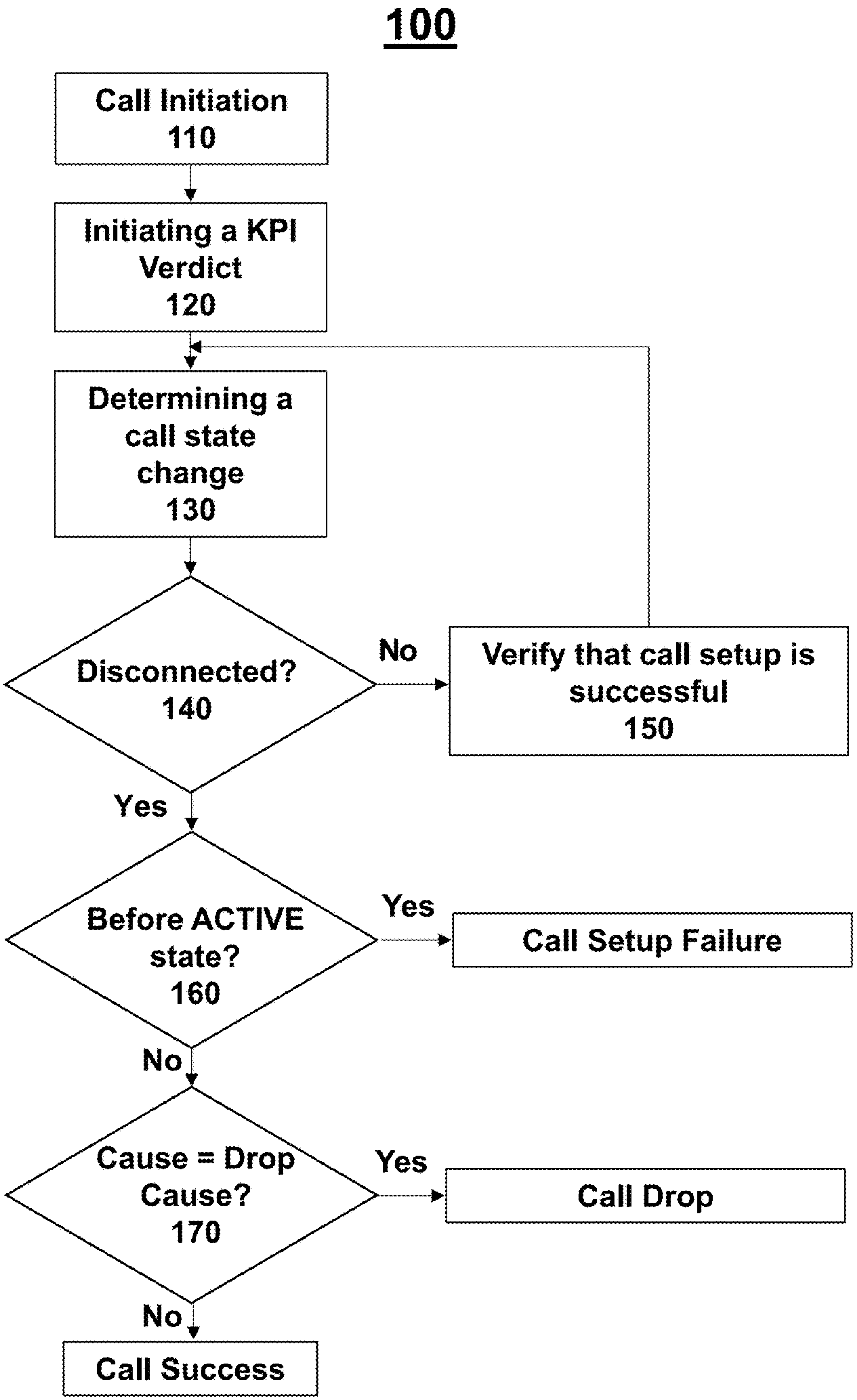
FIG. 1 is a flowchart illustrating an exemplary process for tracking calls attempted or established between a mobile device and a RAN.

FIG. 1 is a flowchart illustrating an exemplary process 100 for tracking calls attempted or established between a mobile device and a RAN. In step 110, a mobile device can detect that the call is initiated. For example, for mobile originated (MO) calls, when the CALL UI is triggered or the telephony system receives outgoing conditions, the mobile device detects that the call has been initiated. By way of further example, for mobile terminated (MT) calls, when the mobile device receives an incoming message from the RAN, the mobile device detects that the call has been initiated.

In some implementations, the mobile device detects that a call has been initiated by monitoring changes in the call state. For example, an operating system running on the mobile device allows it to monitor the precise status of a call using a class such as PreciseCallState, where the class refers to a software module that encapsulates data and methods to perform specific functions or represent entities within a software application. When a call is initiated, the call state changes, and these changes can be detected using listeners or callbacks registered in the application. For Mobile Originated (MO) calls, the state might change to CALL_STATE_DIALING or CALL_STATE_RINGING, indicating that the call setup process has begun. For Mobile Terminated (MT) calls, the state might change to CALL_STATE_INCOMING, indicating an incoming call. The mobile device can interpret these state changes to recognize when a call has been initiated and take appropriate actions accordingly.

In step 120, the mobile device can initiate a determination process for the KPI verdict. For example, after confirming that the PreciseCallState has transitioned from IDLE to DIALING or INCOMING, the mobile device can initiate the KPI verdict process. The mobile device can acquire various types of information for the KPI verdict process. For example, the mobile device can obtain geolocation information, cell information, device information, and SIM card information at the start or end of the call. This information is acquired through a software module that is part of the operating system framework and provides a comprehensive API for accessing data related to the mobile device.

In step 130, the mobile device can determine whether the call state has changed. For example, using a software module such as PreciseCallState, the mobile device can monitor and detect changes in the call state. The PreciseCallState module provides detailed information about the current status of the call, such as whether it has transitioned from IDLE to DIALING, RINGING, INCOMING, or ACTIVE. By registering listeners or callbacks to this module, the mobile device can respond to these state changes and proceed with the actions in the KPI verdict process.

In some implementations, if the mobile device determines that the call state has changed to HOLDING or WAITING, the mobile device waits and the process 100 does not move to step 140.

In step 140, the mobile device can determine whether the call state has transitioned to DISCONNECTED. For example, using the software module such as PreciseCallState, the mobile device can determine that the call state has transitioned to DISCONNECTED. If the mobile device determines that the call state has not transitioned to DISCONNECTED, the process 100 transitions to step 150 where the mobile device determines that, if the call state has transitioned to ACTIVE, the call setup is successful and the process 100 transitions to step 130. Otherwise, if the mobile device determines that the call state has transitioned to DISCONNECTED, the process 100 transitions to step 160.

In step 160, the mobile device determines whether the call state has transitioned to a state before ACTIVE. For example, the mobile device can determine that the call state has transitioned to DIALING or ALERTING, which is a state before ACTIVE.

In some implementations, if the mobile device determines that the call state has transitioned to a state before ACTIVE and the call state has not transitioned from INCOMING, then the mobile device determines that the call setup has failed. The mobile device can determine, when the call state has transitioned from INCOMING, that the call has succeeded or the call setup has failed. For example, using a software module such as ImsReasonInfo, the mobile device can determine that a call has succeeded. ImsReasonInfo can provide detailed information about the reasons for the current status of an IMS (IP Multimedia Subsystem) call. When ImsReasonInfo indicates that one of the call success causes, such as CODE_USER_TERMINATED or CODE_LOCAL_HO_NOT_FEASIBLE, has been met, the mobile device can interpret this as the call having been successfully completed. By analyzing the information provided by the ImsReasonInfo module, the mobile device can determine the outcome of the call and proceed with subsequent processes, such as logging the call success for performance metrics or triggering other application-specific actions. Otherwise, if ImsReasonInfo does not indicate that the call success causes have been met, the mobile device can determine that the call setup has failed. If the mobile device determines that the call state has not transitioned to a state before ACTIVE, the process 100 can transition to step 170.

In step 170, the mobile device can determine a verdict on the call using the software module such as ImsReasonInfo. For example, if ImsReasonInfo indicates that one of the call success causes, such as CODE_USER_TERMINATED or CODE_LOCAL_HO_NOT_FEASIBLE, has been met, the mobile device can interpret this as the call having been successfully completed. Otherwise, the mobile device can determine that the call is disconnected.

In some implementations, when the mobile device determines that the call is disconnected, the mobile device can identify, based on the information indicative of the reason for the disconnection of the voice call received from ImsReasonInfo, a device-side issue responsible for the disconnection of the voice call.

Detailed operations pertaining to the verdict on the call attempts and successful call connections will be further discussed with reference to FIGS. 3-5.

FIG. 2 is a diagram illustrating an example of a call verdict table. For example, the call verdict table depicts a call verdict being determined based on call states transitions and information provided by a software module such as ImsReasonInfo.

As depicted in FIG. 2, if (i) the call state transitioned from DIALING or ALERTING to IDLE or DISCONNECTED and (ii) the software module was not used, then the mobile device determines that the call setup has failed. If the call state transitioned from INCOMING to IDLE or DISCONNECTED and the software module such as ImsReasonInfo indicates (i) a normal call end or (ii) a call failure, the mobile device determines that (i) the call has succeeded or (ii) the call setup has failed.

If the call state transitioned from ACTIVE to IDLE or DISCONNECTED and the software module indicates (i) a normal call end or (ii) a call failure, the mobile device determines that (i) the call has succeeded or (ii) the call has been disconnected. If the call state transitioned from DISCONNECTING to IDLE or DISCONNECTED and the software module indicates (i) a normal call end or (ii) a call failure, the mobile device determines that (i) the call has succeeded or (ii) the call has been disconnected.

Figure 3:
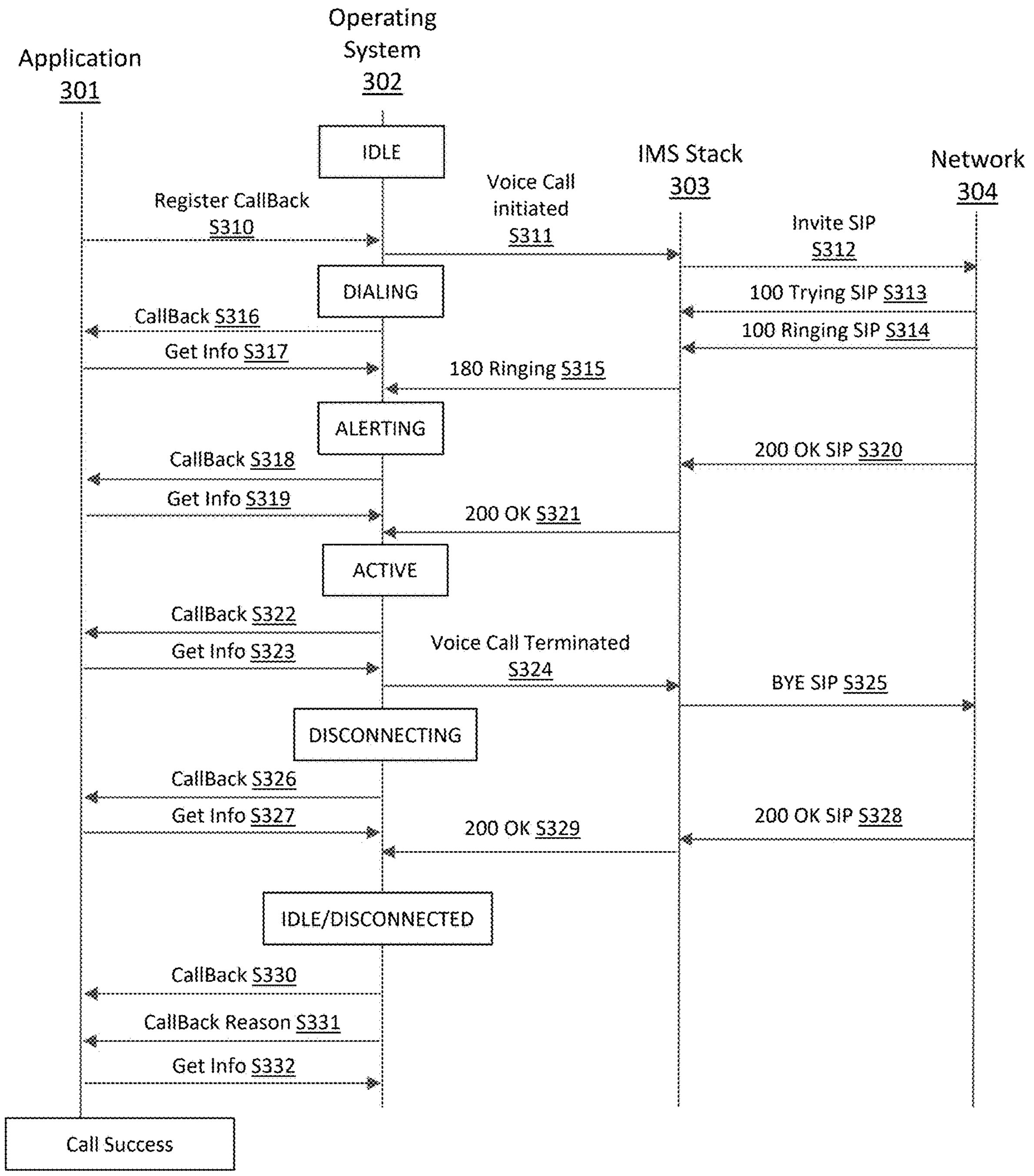
FIG. 3 is a diagram illustrating an example of operations for tracking calls established between a mobile device and a RAN.

FIG. 3 is a diagram illustrating an example of operations 300 for tracking calls established between a mobile device and a network (RAN) 304.

The mobile device can be implemented with an application 301, an operating system 302, and an IP Multimedia Subsystem (IMS) stack 303. The application 301 running on the mobile device can be a software program configured to perform specific tasks or functions, such as communication, entertainment, productivity, or navigation, leveraging the device's hardware and software capabilities. These applications can access various system resources, including sensors, network connections, and location services. The operating system 302 running on the mobile device can be the software that manages hardware resources, provides a user interface, and enables the execution of applications. The operating system 302 can facilitate communication between the device's hardware and software components. The IMS stack 303 running on the mobile device can be a set of software protocols and components that enable IP-based multimedia services, such as voice and video calls, messaging, and presence, by interfacing with carrier networks.

The network 304, specifically a Radio Access Network (RAN), can establish a call with the mobile device by managing the radio connections and signaling required to connect the device to the core network, facilitating voice, data, and multimedia communications. The network 304 can handle tasks such as signal transmission, handover, and quality of service to ensure connection with the mobile device.

In step 310, the application 301 can register a callback to the operating system to monitor and initiate voice calls. This process involves several steps, including interacting with the IMS stack 303 and sending signaling messages to the network 304.

The application 301 can register a callback with the operating system 302 using an application programming interface (API) provided by the operating system framework. For example, the application 301 can use the TelephonyManager class to register a PreciseCallStateListener to monitor call states to thereby receive notification when the call state changes. The application 301 can also register a callback with the operating system 302 to receive notifications when a voice call over IMS (IP Multimedia Subsystem) is disconnected. For example, the application 301 can use the TelephonyManager class to register an ImsCallDisconnectCauseListener to receive IMS call disconnecting cause when the voice call over the IMS is disconnected. This process involves utilizing the IMS reason codes provided by the IMS stack 303 to determine the cause of the call disconnection.

The callback registration allows the application 301 to be notified of precise call state changes, and the use of ImsCallDisconnectCauseListener provides specific codes and messages that help determine the cause of the disconnection, enabling the application 301 to handle each scenario appropriately.

In step 311, the operating system 302 can process the call request and interact with the IMS stack 303 to set up the call. The IMS stack 303 can manage IP-based voice calls using the SIP protocol. The operating system 302 can invoke the appropriate methods in the IMS stack 303 to start the call setup process. The operating system 302 can update the call state of the mobile device from IDLE to DIALING.

In step 312, the IMS stack can construct an INVITE SIP message to initiate the call setup with the network 304. In some implementations, the INVITE message includes information such as the caller's and callee's SIP addresses, media capabilities, and session parameters. The INVITE SIP message can be transmitted over the network 304 to the recipient's IMS stack.

In step 313, the network 304 can transmit a 100 Trying SIP response to the IMS stack 303 on the mobile device to indicate that the INVITE request has been received and is being processed. This provisional response ensures that the caller knows the request is being handled. The network 304 can perform the routing and resource allocation for the call. This may involve checking the availability of the callee and setting up the required media paths.

In step 314, once the callee's device is located and the call is being set up, the network 304 can transmit a 180 Ringing SIP response to the IMS stack 303 on the caller's mobile device. This response can indicate that the callee's device is ringing.

In step 315, the IMS stack 303 can transmit a 180 Ringing SIP message to the operating system 302 of a mobile device, which notifies that the callee's device is ringing. The IMS stack 303 can parse the 180 Ringing SIP message to extract relevant information such as the call state and any headers or parameters that indicate the progress of the call setup. The IMS stack 303 can update its internal call state to reflect that the callee's device is ringing. This state change can enable maintaining accurate call progress information within the IMS stack 303. The IMS stack 303 can generate a call state change event and transmit this event to the operating system 302, where the event includes the updated call state information and any other relevant data extracted from the 180 Ringing SIP message.

In some implementations, the operating system 302 can receive the call state change event from the IMS stack 303 and process the event to update and notify any registered applications or listeners about the call state change. For example, the operating system 302 can update that the call state has transitioned from DIALING to ALERTING.

In step 316, the operating system 302 can invoke a callback by notifying the application 301 about specific events or changes in state. For example, the operating system 302 can call the function or method that the application 301 provided during the registration process at step 310 to thereby allow the application 301 to receive notification as the call state has transitioned (e.g., from IDLE to DIALING).

In step 317, the application 301 can acquire information from the operating system 302. For example, the information can include device information, modem information, software (SW) information, cell information, new radio (NR) cell information, long-term-evolution (LTE) cell information, NR signal information, LTE signal information, geolocation information, and a subscriber identity module (SIM) information.

In steps 318 and 319, the application 301 and the operating system 302 can perform operations similar to those described in steps 316 and 317 as the call state has transitioned from DIALING to ALERTING.

In step 320, when a call is successfully established, the network 304 can transmit a 200 OK SIP response message to confirm the establishment. The 200 OK message can indicate that the network 304 has successfully processed the call setup request and the path for the call media (voice or video data) is ready. This message can include session description protocol (SDP) data that specifies the media formats and network endpoints to be used for the call.

In step 321, upon receiving the 200 OK message from the network 304, the IMS stack 303 can process this response to extract relevant session parameters and configurations such as codec information, IP addresses, and port numbers necessary for setting up the media stream. After processing the 200 OK message, the IMS stack 303 can communicate with the operating system 302 to signal that the call has been successfully established, which involves invoking a callback or sending an internal event to the operating system 302.

For example, the operating system 302 can update the call state to be transitioned from ALERTING to ACTIVE, and in steps 322 and 323, the application 301 and the operating system 302 can perform operations similar to those described in steps 316 and 317 as the call state has transitioned from ALERTING to ACTIVE.

In step 324, when the termination of the voice call is detected by the operating system 302, the operating system 302 can invoke a specific method or API associated with the IMS stack 303. For example, the operating system 302 can call a function that ends the call or send a message to the IMS stack 303 indicating that the call should be terminated. In some implementations, the operating system 302 can update the call state to transition from ACTIVE to DISCONNECTING.

In step 325, the IMS stack 303 can, upon receiving the termination signal from the operating system 302, initiate a SIP BYE request. For example, the SIP BYE request can refer to a method in the Session Initiation Protocol (SIP) used to terminate sessions like voice calls. The IMS stack 303 can construct and transmit the SIP BYE message to the network 304 to indicate that the mobile device intends to release the call and terminate the connection.

In steps 326 and 327, the application 301 and the operating system 302 can perform operations similar to those described in steps 316 and 317 as the call state has transitioned from ACTIVE to DISCONNECTING.

In step 328, upon receiving the SIP BYE message, the network 304 can respond with a SIP OK message, acknowledging the termination of the call. In step 329, the IMS stack 303 can process this acknowledgment and finalize the call termination on the device side. After the call has been successfully terminated and all cleanup has been performed by the IMS stack 303, the operating system 302 can receive an OK message from the IMS stack 303 to update the call state from DISCONNECTING to IDLE/DISCONNECTED, which informs the application that the call has ended.

In step 330, the operating system 302 can perform operations similar to those described in step 316 as the call state has transitioned to DISCONNECTING.

In step 331, the operating system 302 can invoke a callback to notify the application 301 of the reasons for a voice call over IMS being disconnected. For example, the operating system 302 can invoke ImsCallDisconnectedCauseListener, which was registered in step 310, for the application 301 to receive IMS call disconnecting cause such as CODE_LOCAL_CALL_TERMINATE or CODE_LOCAL_CALL_BUSY.

In step 332, the application 301 can acquire information from the operating system 302. For example, the information can include device information, modem information, software (SW) information, cell information, new radio (NR) cell information, long-term-evolution (LTE) cell information, NR signal information, LTE signal information, geolocation information, and a subscriber identity module (SIM) information.

Through the operations 300 described with respect to FIG. 3, the application 301 can determine that the call has succeeded and ended without failures.

Figure 4:
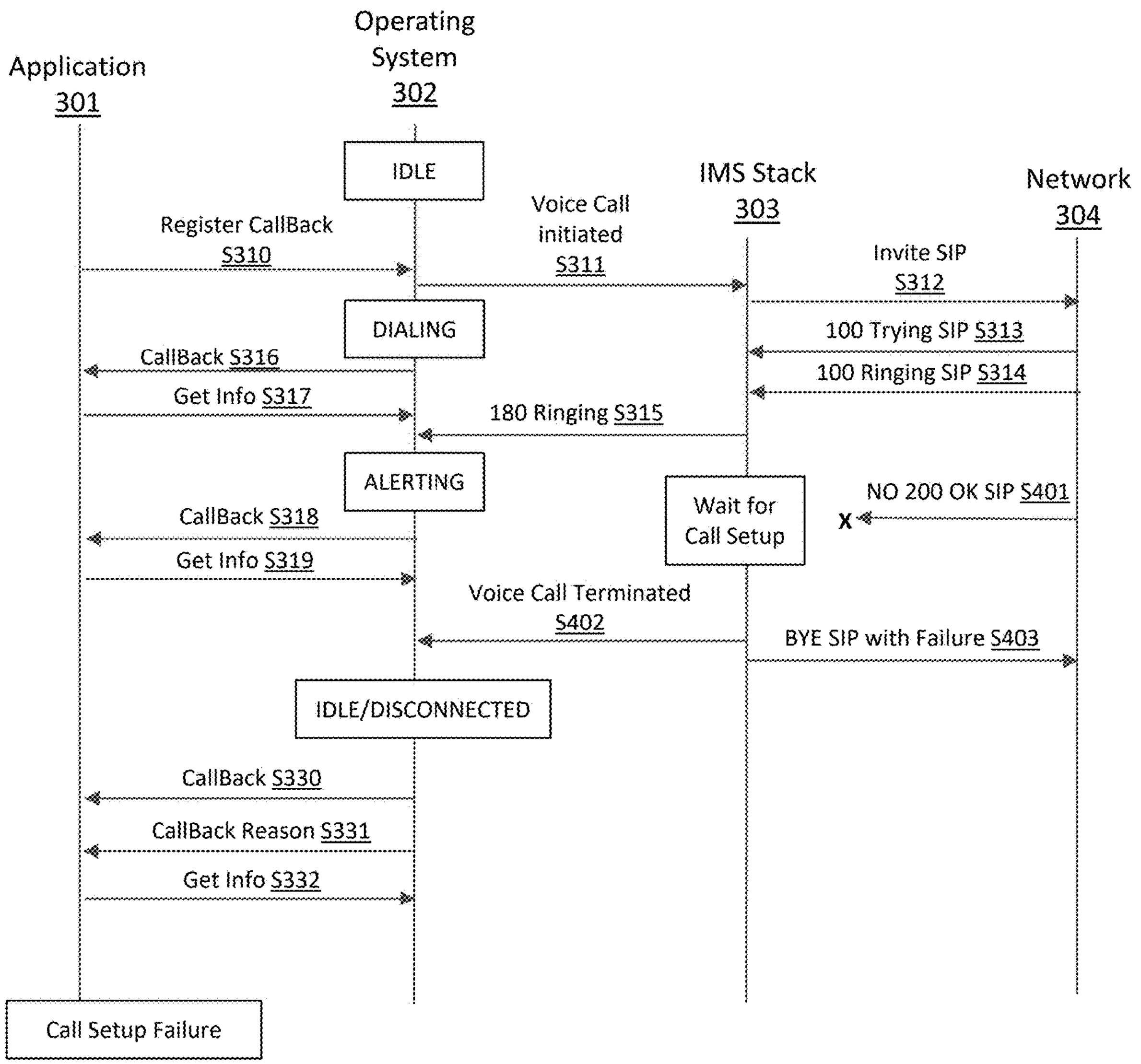
FIG. 4 is a diagram illustrating an example of operations for tracking calls attempted between a mobile device and a RAN when the call setup fails.

FIG. 4 is a diagram illustrating an example of operations 400 for tracking calls attempted between a mobile device and a RAN 304 when the call setup fails. The operations 400 are similar to those previously described in the operations 300, with the exception that in step 401, the IMS stack 303 fails to receive an OK SIP message from the network 304 in response to the invite SIP message sent in step 312. Consequently, the IMS stack 303 waits for the call setup to complete. In step 402, after the timer expires, the IMS stack 303 can transmit a message to the operating system 302 indicating that the voice call has been terminated.

In step 403, the IMS stack 303 can transmit, to the network 304, a BYE SIP message to signal the end of a session or call between two endpoints in the network 304. For example, the IMS stack 303 can construct a BYE SIP message with headers and parameters indicating a termination due to failure, such as error codes or status information explaining the reason for the call termination. The BYE SIP message can be transmitted over the network 304 to inform the remote party that the call has been disconnected due to an issue, facilitating the closure of the session on all involved network elements.

Through the operations 400 described with respect to FIG. 4, the application 301 can determine that the call setup has failed. For example, as the call state has transitioned to IDLE/DISCONNECTED before reaching ACTIVE, the application 301 can determine that the call setup has failed.

Figure 5:
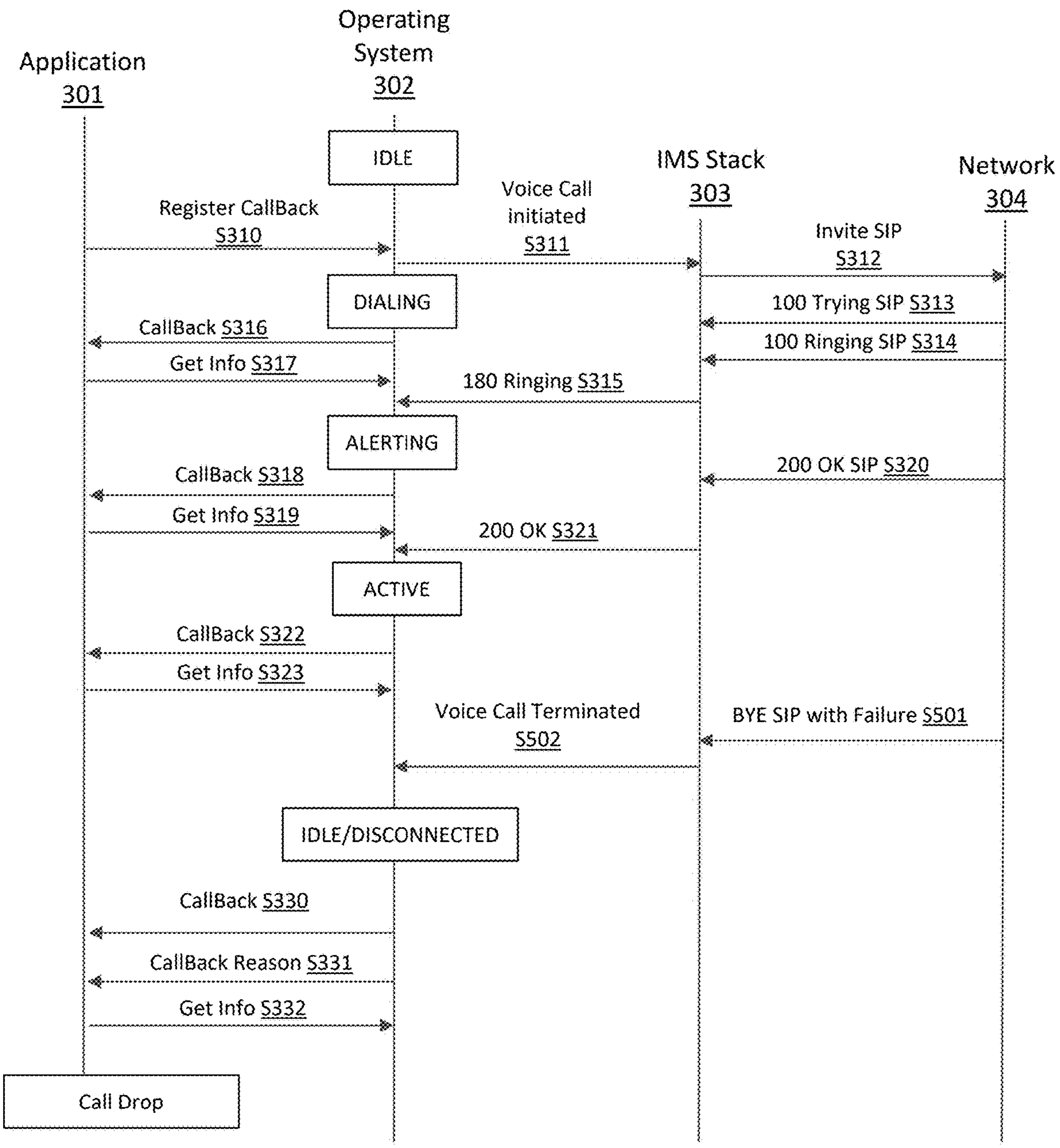
FIG. 5 is a diagram illustrating an example of operations for tracking calls established between a mobile device and a RAN when the call is disconnected.

FIG. 5 is a diagram illustrating an example of operations 500 for tracking calls attempted between a mobile device and a RAN 304 when the call is disconnected after the call setups is completed and before the call completes normally. The operations 500 are similar to those previously described in the operations 300, with the exception that in step 501, the IMS stack 303 receives, from the network 304, a BYE SIP message with failure.

For example, when the network 304 needs to terminate an ongoing call session due to a failure or operational necessity, it transmits a BYE SIP message with failure indications to the IMS stack 303 of the mobile device. The BYE SIP message can refer to a signaling protocol element used to end a communication session and includes specific error codes or status information detailing the reason for the call termination, such as connectivity issues, service disruptions, or network-initiated call teardowns.

In step 502, upon receiving this message, the IMS stack 303 can process the failure information and terminate the session, updating the call state and possibly triggering notifications or alerts to other system components. For example, the operating system 302 can receive, from the IMS stack 303, the information regarding the termination of the call and update that the call state has transitioned from ACTIVE to IDLE/DISCONNECTED.

Through the operations 500 described with respect to FIG. 5, the application 301 can determine that the call has been disconnected. For example, as the call state has transitioned to IDLE/DISCONNECTED after reaching ACTIVE, the application 301 can determine that the call has been disconnected.

In some implementations, the application 301 can identify, based on the reasons for a voice call over IMS being disconnected received at step 331 and information acquired at step 332, a device-side issue responsible for the disconnection of the voice call. For example, the application 301 can analyze the reasons and the information to identify modem failures in certain SW versions based on the device information, the modem information, and the SW information.

Figure 6:
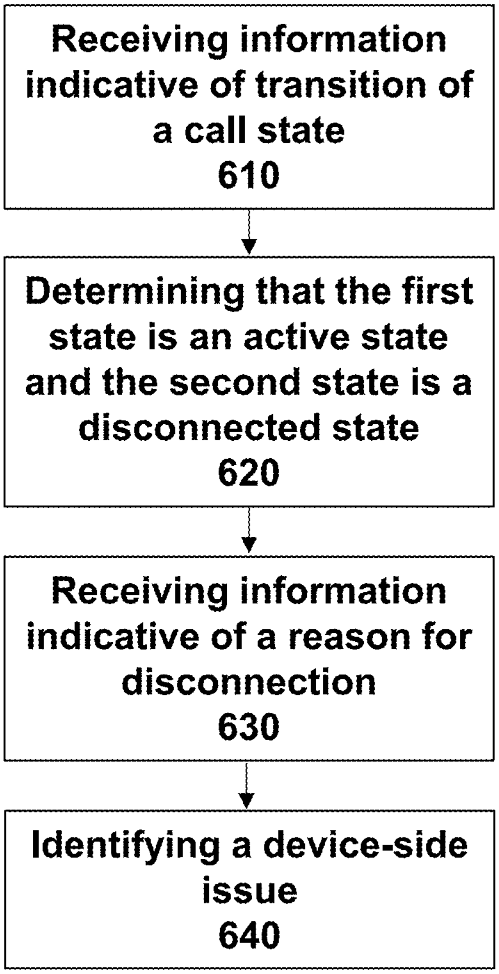
FIG. 6 is a flowchart showing an exemplary process for identifying a device-side issue when the call is disconnected.

FIG. 6 is a flowchart showing an exemplary process 600 for tracking calls attempted or established between a mobile device and the network 304.

In step 610, the application 301 can receive, using a first function registered with an operating system 302 of the mobile device, information indicative of a transition of a call state associated with a voice call associated with the mobile device from a first state to a second state. For example, the first function is configured to interface with a first set of one or more application programming interfaces (APIs) of the operating system, and the information indicative of the transition of the call state is received through at least one API of the first set of one or more APIs. The first function can be registered with (i) a telephony framework to thereby specify types of call state changes to be monitored and (ii) the at least one API of the first set of one or more APIs to thereby monitor an event.

For example, as described above with respect to FIGS. 3-5, the application 301 can receive, from the operating system 302, information regarding the transition of the call state when the operating system 302 calls the function that the application 301 provided during the registration process to thereby allow the application 301 to receive notification as the call state has transitioned.

In step 620, the application 301 can determine, based on the information received at step 610, that the first state is an active state and the second state is a disconnected state. In some implementations, the application 301 can determine, based on the received information, that the first state is not an active state and the second state is a disconnected state.

In step 630, the application 301 can, responsive to determining that the first state is an active state and the second state is a disconnected state, receive, using a second function registered with the operating system of a mobile device, information indicative of a reason for disconnection of the voice call, where the second function is configured to interface with a second set of one or more APIs of the operating system, the information indicative of the reason for the disconnection of the voice call is received through at least one API of the second set of one or more APIs, and the information indicative of the reason for the disconnection of the voice call is generated based on an output of an IMS of the mobile device.

For example, as described above with respect to FIGS. 3-5, the application 301 can receive, when the operating system 302 invokes a callback to notify the application 301 of the reasons for a voice call over IMS being disconnected, information indicative of a reason for disconnection of the voice call.

In some implementations, the application 301 can, responsive to determining that the first state is not an active state and the second state is a disconnected state, receive, using the second function registered with the operating system of a mobile device, information indicative of a reason for setup failure of the voice call. For example, the information indicative of the reason for the setup failure of the voice call is received through the at least one API of the second set of one or more APIs, and the information indicative of the reason for the setup failure of the voice call is generated based on the output of the IMS of the mobile device.

In step 640, the application 301 can identify, based on the information indicative of the reason for the disconnection of the voice call received at step 630, a device-side issue responsible for the disconnection of the voice call. In some implementations, the application 301 can identify, based on the information indicative of the reason for the setup failure of the voice call, a device-side issue responsible for the setup failure of the voice call.

For example, the application 301 can acquire information including device information, modem information, software (SW) information, cell information, new radio (NR) cell information, long-term-evolution (LTE) cell information, NR signal information, LTE signal information, geolocation information, and a subscriber identity module (SIM) information to determine the device-side issue based on the acquired information.

In some implementations, the application 301 can transmit, to a server, the acquired information to thereby cause the server to identify the device-side issue responsible for the disconnection of the voice call, where the server is configured to identify modem failures in certain SW versions on particular devices based on the device information, the modem information, and the SW information.

Figure 7:
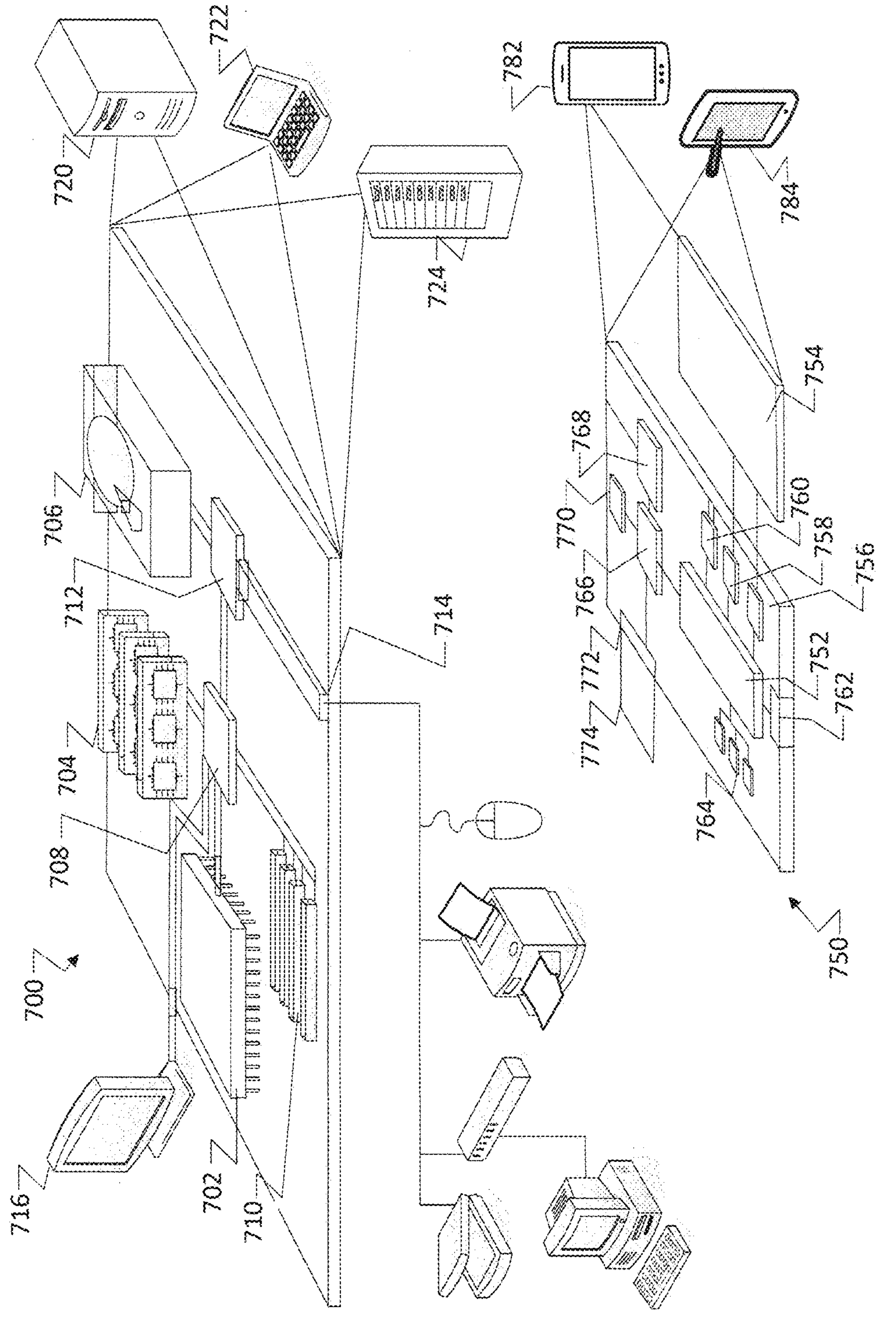
FIG. 7 is a diagram illustrating a computing system that can be used in connection with computer-implemented methods described in this specification.

FIG. 7 is a diagram illustrating an example of a computing device 700 and a mobile computing device 750 (also referred to herein as a user equipment) that are employed to execute implementations of the present disclosure. The computing device 700 is intended to represent various forms of digital computers, such as laptops, desktops, workstations, personal digital assistants, servers, blade servers, mainframes, and other appropriate computers. The mobile computing device 750 is intended to represent various forms of mobile devices, such as personal digital assistants, cellular telephones, smart-phones, AR devices, and other similar computing devices. The components shown here, their connections and relationships, and their functions, are meant to be examples only, and are not meant to be limiting. The computing device 700 and/or the mobile computing device 750 can form at least a portion of the application installation environment described above.

The computing device 700 includes a processor 702, a memory 704, a storage device 706, a high-speed interface 708, and a low-speed interface 712. In some implementations, the high-speed interface 708 connects to the memory 704 and multiple high-speed expansion ports 710. In some implementations, the low-speed interface 712 connects to a low-speed expansion port 714 and the storage device 706. Each of the processor 702, the memory 704, the storage device 706, the high-speed interface 708, the high-speed expansion ports 710, and the low-speed interface 712, are interconnected using various buses, and may be mounted on a common motherboard or in other manners as appropriate. The processor 702 can process instructions for execution within the computing device 700, including instructions stored in the memory 704 and/or on the storage device 706 to display graphical information for a graphical user interface (GUI) on an external input/output device, such as a display 716 coupled to the high-speed interface 708. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of a computer-readable medium, such as a magnetic or optical disk.

The storage device 706 is capable of providing mass storage for the computing device 700. In some implementations, the storage device 706 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 702, perform one or more methods, such as those described above. The instructions can also be stored by one or more storage devices, such as computer-readable or machine-readable mediums, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is an example only. In some implementations, the high-speed interface 708 is coupled to the memory 704, the display 716 (e.g., through a graphics processor or accelerator), and to the high-speed expansion ports 710, which may accept various expansion cards. In the implementation, the low-speed interface 712 is coupled to the storage device 706 and the low-speed expansion port 714. The low-speed expansion port 714, which may include various communication ports (e.g., Universal Serial Bus (USB), Bluetooth, Ethernet, wireless Ethernet) may be coupled to one or more input/output devices. Such input/output devices may include a scanner, a printing device, or a keyboard or mouse. The input/output devices may also be coupled to the low-speed expansion port 714 through a network adapter. Such network input/output devices may include, for example, a switch or router.

The computing device 700 may be implemented in a number of different forms, as shown in the FIG. 7. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device, such as a mobile computing device 750. Each of such devices may contain one or more of the computing device 700 and the mobile computing device 750, and an entire system may be made up of multiple computing devices communicating with each other. In some implementations, the computing device 700 can be implemented to perform network functionalities in cloud environments.

The mobile computing device 750 includes a processor 752; a memory 764; an input/output device, such as a display 754; a communication interface 766; and a transceiver 768; among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a common motherboard or in other manners as appropriate. In some implementations, the mobile computing device 750 may include a camera device(s).

The processor 752 can execute instructions within the mobile computing device 750, including instructions stored in the memory 764. The processor 752 may be implemented as a chipset of chips that include separate and multiple analog and digital processors. For example, the processor 752 may be a Complex Instruction Set Computers (CISC) processor, a Reduced Instruction Set Computer (RISC) processor, or a Minimal Instruction Set Computer (MISC) processor. The processor 752 may provide, for example, for coordination of the other components of the mobile computing device 750, such as control of user interfaces (UIs), applications run by the mobile computing device 750, and/or wireless communication by the mobile computing device 750.

The processor 752 may communicate with a user through a control interface 758 and a display interface 756 coupled to the display 754. The display 754 may be, for example, a Thin-Film-Transistor Liquid Crystal Display (TFT) display, an Organic Light Emitting Diode (OLED) display, or other appropriate display technology. The display interface 756 may include appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a Single in Line Memory Module (SIMM) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provided as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 752, perform one or more methods, such as those described above. The instructions can also be stored by one or more storage devices, such as one or more computer-readable or machine-readable mediums, such as the memory 764, the expansion memory 774, or memory on the processor 752. In some implementations, the instructions can be received in a propagated signal, such as, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as long-term evolution (LTE), 5G New Radio (NR), Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS), etc. Such communication may occur, for example, through the transceiver 768 using a radio frequency. In addition, short-range communication, such as using a Bluetooth or Wi-Fi, may occur. In addition, a Global Positioning System (GPS) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in FIG. 7. For example, it may be implemented in the mobile device described with respect to FIGS. 1-6. Other implementations may include a phone device 782 and a tablet device 784. The mobile computing device 750 may also be implemented as a component of a smart-phone, personal digital assistant, AR device, or other similar mobile device.

The computing device 700 may be implemented in the network described above with respect to FIGS. 1-6. For example, the various components included in the network 304 can include the computing device 700.

Computing device 700 and/or 750 can also include USB flash drives. The USB flash drives may store operating systems and other applications. The USB flash drives can include input/output components, such as a wireless transmitter or USB connector that may be inserted into a USB port of another computing device.

Although a few implementations have been described in detail above, other modifications may be made without departing from the scope of the inventive concepts described herein, and, accordingly, other implementations are within the scope of the following claims.

What is claimed is:

1. A computer-implemented method for tracking calls attempted or established between a mobile device and a radio access network (RAN), the method comprising:

receiving, using a first function registered with an operating system of a mobile device, first information indicative of a transition of a call state associated with a voice call associated with the mobile device from a first state to a second state, wherein the first function is configured to interface with a first set of one or more application programming interfaces (APIs) of the operating system, and wherein the first information indicative of the transition of the call state is received through at least one API of the first set of one or more APIs;

determining, based on the first information, that the first state is an active state and the second state is a disconnected state;

responsive to determining that the first state is an active state and the second state is a disconnected state, receiving, using a second function registered with the operating system of the mobile device, information indicative of a reason for disconnection of the voice call, wherein the second function is configured to interface with a second set of one or more APIs of the operating system, wherein the information indicative of the reason for the disconnection of the voice call is received through at least one API of the second set of one or more APIs, and wherein the information indicative of the reason for the disconnection of the voice call is generated based on an output of an IP Multimedia Subsystem (IMS) of the mobile device; and identifying, based on the information indicative of the reason for the disconnection of the voice call, a device-side issue responsible for the disconnection of the voice call.

2. The computer-implemented method of claim 1, wherein the first function is registered with a telephony framework to thereby specify types of call state changes to be monitored.

3. The computer-implemented method of claim 1, wherein the first function is registered with the at least one API of the first set of one or more APIs to thereby monitor an event.

4. The computer-implemented method of claim 1, further comprising:

receiving, using the first function, second information indicative of a transition of a call state from a third state to a fourth state;

determining, based on the second information, that the third state is not an active state and the fourth state is a disconnected state;

responsive to determining that the third state is not an active state and the fourth state is a disconnected state, receiving, using the second function registered with the operating system of the mobile device, information indicative of a reason for setup failure of the voice call, wherein the information indicative of the reason for the setup failure of the voice call is received through the at least one API of the second set of one or more APIs, and wherein the information indicative of the reason for the setup failure of the voice call is generated based on the output of the IMS of the mobile device; and identifying, based on the information indicative of the reason for the setup failure of the voice call, a device-side issue responsible for the setup failure of the voice call.

5. The computer-implemented method of claim 4, wherein identifying the device-side issue responsible for the setup failure of the voice call comprises:

acquiring information including device information, modem information, software (SW) information, cell information, new radio (NR) cell information, long-term-evolution (LTE) cell information, NR signal information, LTE signal information, geolocation information, and a subscriber identity module (SIM) information, and determining the device-side issue based on the acquired information.

6. The computer-implemented method of claim 4, wherein the call state of the mobile device transitions from the third state to the disconnected state based on a signal received from a network, the third state not corresponding to the active state and the signal indicating termination of the voice call.

7. The computer-implemented method of claim 1, wherein identifying the device-side issue responsible for the disconnection of the voice call comprises:

acquiring information including device information, modem information, software (SW) information, cell information, new radio (NR) cell information, long-term-evolution (LTE) cell information, NR signal information, LTE signal information, geolocation information, and a subscriber identity module (SIM) information, and determining the device-side issue based on the acquired information.

8. The computer-implemented method of claim 7, wherein identifying the device-side issue responsible for the disconnection of the voice call comprises:

transmitting, to a server, the acquired information to thereby cause the server to identify the device-side issue responsible for the disconnection of the voice call, wherein the server is configured to identify modem failures in certain SW versions on particular devices based on the device information, the modem information, and the SW information.

9. The computer-implemented method of claim 1, wherein the call state of the mobile device transitions from the active state to the disconnected state based on a signal received from a network, the signal indicating termination of a call associated with the voice call.

10. A non-transitory recording medium storing a program, wherein execution of the program causes one or more mobile devices of a wireless communication system to perform operations comprising:

receiving, using a first function registered with an operating system of a mobile device, first information indicative of a transition of a call state associated with a voice call associated with the mobile device from a first state to a second state, wherein the first function is configured to interface with a first set of one or more application programming interfaces (APIs) of the operating system, and wherein the first information indicative of the transition of the call state is received through at least one API of the first set of one or more APIs;

determining, based on the first information, that the first state is an active state and the second state is a disconnected state;

responsive to determining that the first state is an active state and the second state is a disconnected state, receiving, using a second function registered with the operating system of the mobile device, information indicative of a reason for disconnection of the voice call, wherein the second function is configured to interface with a second set of one or more APIs of the operating system, wherein the information indicative of the reason for the disconnection of the voice call is received through at least one API of the second set of one or more APIs, and wherein the information indicative of the reason for the disconnection of the voice call is generated based on an output of an IP Multimedia Subsystem (IMS) of the mobile device; and identifying, based on the information indicative of the reason for the disconnection of the voice call, a device-side issue responsible for the disconnection of the voice call.

11. The non-transitory recording medium of claim 10, wherein the first function is registered with a telephony framework to thereby specify types of call state changes to be monitored.

12. The non-transitory recording medium of claim 10, wherein the first function is registered with the at least one API of the first set of one or more APIs to thereby monitor an event.

13. The non-transitory recording medium of claim 10, wherein the operations further comprise:

receiving, using the first function, second information indicative of a transition of a call state from a third state to a fourth state;

determining, based on the second information, that the third state is not an active state and the fourth state is a disconnected state;

responsive to determining that the third state is not an active state and the fourth state is a disconnected state, receiving, using the second function registered with the operating system of the mobile device, information indicative of a reason for setup failure of the voice call, wherein the information indicative of the reason for the setup failure of the voice call is received through the at least one API of the second set of one or more APIs, and wherein the information indicative of the reason for the setup failure of the voice call is generated based on the output of the IMS of the mobile device; and identifying, based on the information indicative of the reason for the setup failure of the voice call, a device-side issue responsible for the setup failure of the voice call.

14. The non-transitory recording medium of claim 13, wherein identifying the device-side issue responsible for the setup failure of the voice call comprises:

acquiring information including device information, modem information, software (SW) information, cell information, new radio (NR) cell information, long-term-evolution (LTE) cell information, NR signal information, LTE signal information, geolocation information, and a subscriber identity module (SIM) information, and determining the device-side issue based on the acquired information.

15. The non-transitory recording medium of claim 13, wherein the call state of the mobile device transitions from the third state to the disconnected state based on a signal received from a network, the third state not corresponding to the active state and the signal indicating termination of the voice call.

16. The non-transitory recording medium of claim 10, wherein identifying the device-side issue responsible for the disconnection of the voice call comprises:

acquiring information including device information, modem information, software (SW) information, cell information, new radio (NR) cell information, long-term-evolution (LTE) cell information, NR signal information, LTE signal information, geolocation information, and a subscriber identity module (SIM) information, and determining the device-side issue based on the acquired information.

17. The non-transitory recording medium of claim 16, wherein identifying the device-side issue responsible for the disconnection of the voice call comprises:

transmitting, to a server, the acquired information to thereby cause the server to identify the device-side issue responsible for the disconnection of the voice call, wherein the server is configured to identify modem failures in certain SW versions on particular devices based on the device information, the modem information, and the SW information.

18. The non-transitory recording medium of claim 10, wherein the call state of the mobile device transitions from the active state to the disconnected state based on a signal received from a network, the signal indicating termination of a call associated with the voice call.

19. A computer-implemented device for tracking calls attempted or established between a mobile device and a radio access network (RAN), the device comprising:

at least one processor; and memory coupled to the at least one processor and storing instructions that, based on being executed by the at least one processor, perform operations comprising:

receiving, using a first function registered with an operating system of a mobile device, first information indicative of a transition of a call state associated with a voice call associated with the mobile device from a first state to a second state, wherein the first function is configured to interface with a first set of one or more application programming interfaces (APIs) of the operating system, and wherein the first information indicative of the transition of the call state is received through at least one API of the first set of one or more APIs;

determining, based on the first information, that the first state is an active state and the second state is a disconnected state;

responsive to determining that the first state is an active state and the second state is a disconnected state, receiving, using a second function registered with the operating system of the mobile device, information indicative of a reason for disconnection of the voice call, wherein the second function is configured to interface with a second set of one or more APIs of the operating system, wherein the information indicative of the reason for the disconnection of the voice call is received through at least one API of the second set of one or more APIs, and wherein the information indicative of the reason for the disconnection of the voice call is generated based on an output of an IP Multimedia Subsystem (IMS) of the mobile device; and identifying, based on the information indicative of the reason for the disconnection of the voice call, a device-side issue responsible for the disconnection of the voice call.

20. The computer-implemented device of claim 19, wherein identifying the device-side issue responsible for the disconnection of the voice call comprises:

acquiring information including cell information, new radio (NR) cell information, long-term-evolution (LTE) cell information, NR signal information, LTE signal information, geolocation information, and a subscriber identity module (SIM) information, and determining the device-side issue based on the acquired information.

* * * * *